Patented Nov. 19, 1929

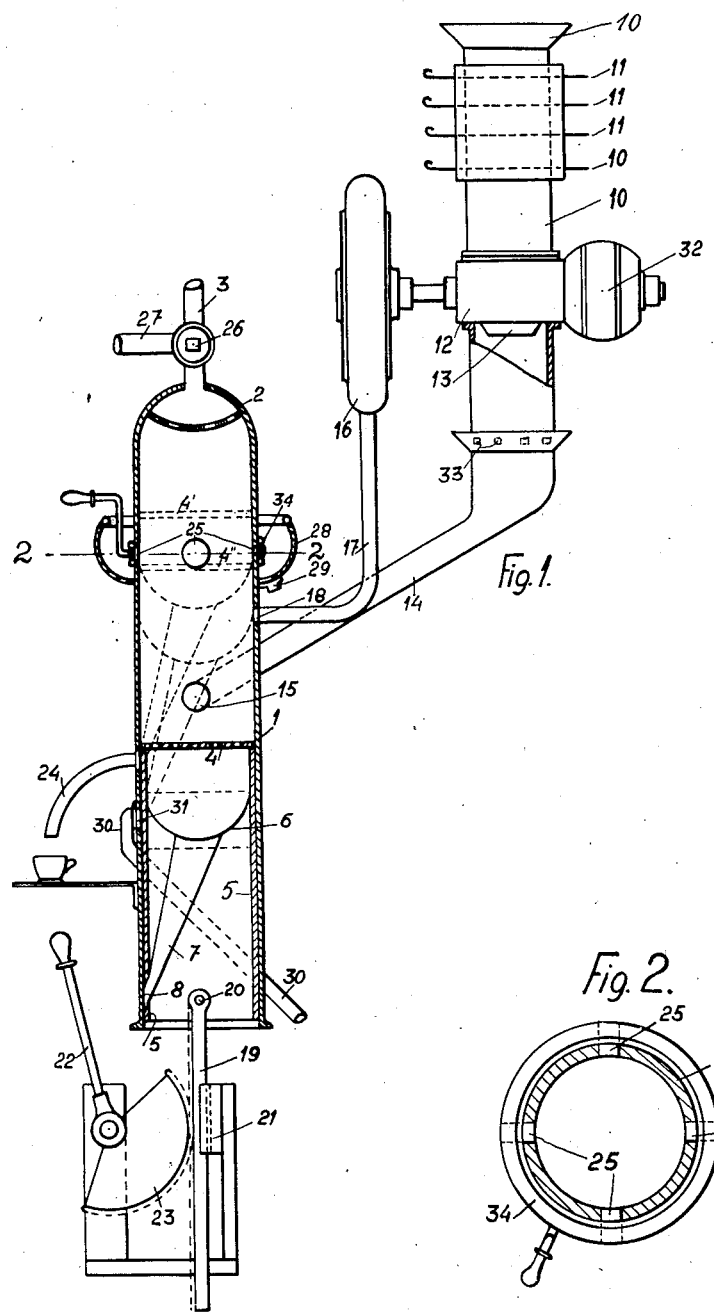

1,736,460

UNITED STATES PATENT OFFICE

ENRICO PISTONI AND LORENZO PISTONI, OF MILAN, ITALY

COFFEE-MAKING APPARATUS

Application filed July 20, 1928, Serial No. 294,186, and in Italy July 29, 1927.

This invention relates to a coffee-making apparatus and consists in the provision of a vessel having lateral outlet and inlet ports and containing a slidable, open-ended cylinder adapted in its upper positions to act as a closure for said ports, the cylinder being fitted with a strainer adapted to receive coffee powder from a mill in the lower position of the cylinder and with a coffee receptacle adapted to communicate with a delivery spout on the vessel in the upper position of the cylinder, water for the making of the coffee being admitted into vessel from the top thereof. The coffee powder is fed into the vessel by means of an air current, and means are provided for effectively clearing the vessel and coffee receptacle from grouts.

Fig. 1 of the accompanying drawings represents a vertical section of the device, and Fig. 2, a cross-section on the line 2—2 of Fig. 1.

The apparatus is composed of a bell-shaped cylindrical vessel 1 within which an open-ended cylinder 5 is arranged to slide. The cylinder fits the vessel snugly so that it will act as a closure for a plurality of inlet and outlet ports with which the median and upper portions of the vessel are provided. For moving the cylinder up and down in the vessel, a pivoted hand lever 22 is provided which moves, by means of a toothed sector 23, a rack 19, the latter being held in a guide 21 and pivoted at 20 to the cylinder. The upper end of the cylinder 5 is covered with a strainer 4 under which there is a coffee receptacle 6. The latter has an inclined discharge pipe 7 which opens at 8 through the cylinder wall and which can be set in communication with a delivery spout 24 connected to the vessel 1. A coffee mill 12 is provided which discharges the powder at 13 into an inclined pipe 14 opening through a port 15 into the vessel. An electric motor 32 drives a coffee mill and also a fan 16 which receives air from the vessel 1 through a port 18 and a pipe 17. Apertures 33 are provided in the powder conduit for the admission of air. A hopper 10, which receives the coffee beans for the mill, is fitted with a plurality of shutters 11 arranged at different elevations so as to allow the coffee to be apportioned according to requirements.

Surrounding a plurality of ports 25 in the vessel is a gutter 28 provided with an outlet 29 for the grouts. Another port 31, which communicates with a discharge pipe 30, is arranged so as to communicate also with the discharge pipe 7 of the coffee receptacle when the strainer 4 is situated immediately below the ports 25. A ring 34 which can be rotated by means of a handle and which has apertures adapted to register with the ports 25, can be used for closing the latter from the outside.

Hot water and steam can be admitted into the vessel through the domed crown 2 from a pipe 3, and another pipe 27 supplies cold water, a three-way cock 26 being provided for the selection of one or the other.

The action is as follows:

With the different elements in the position shown by full lines in Fig. 1, the coffee mill 12 and the fan 16 are set in motion, the required quantity of coffee beans having previously been measured off by means of one of the shutters 11 and fed into the mill. The fan draws air from the vessel and fresh air is drawn in through the pipe 14 from the apertures 33, the ports 25 being closed by the ring 34. The coffee powder is carried along by the air current and settles in an even layer on the strainer 4. After the grinding of the coffee, the cylinder 5 is raised by means of a hand lever 22 so as to bring the strainer into the position 4' and the discharge pipe 7 into communication with the spout 24. The cock 26 is then opened for admitting hot water and steam from the pipe 3 into the upper part of the vessel. The water percolates through the coffee layer and through the strainer 4, and the brewed coffee flows from the receptacle 6 through the pipe 7 and spout 24 and is delivered by the latter.

In order to clear away the grouts after the brewing operation, the cylinder is lowered so as to place the strainer in the position 4″ immediately beneath the ports 25 which are set free by a corresponding adjustment of the ring 34. Cold water is then admitted from the pipe 27 so as to wash the grouts off the strainer through the ports 25 into the gutter 28 whence they are discharged. Water passing through the strainer into the receptacle 6 cleans the latter and is discharged through the pipe 30.

The constructional details of the apparatus may be varied within the scope of the invention.

We claim:

1. A coffee making apparatus comprising a cylindrical vessel having lateral inlet and outlet ports, an open-ended cylinder fitted slidably and snugly in said vessel so as to act in its upper positions as a closure for the ports, means for shifting the cylinder up and down in the vessel, a strainer covering the upper end of the cylinder, a coffee mill communicating with the vessel through one of said ports so as to deliver the coffee powder on to said strainer when the cylinder is in the lower end position, a coffee receptacle arranged in the cylinder under the strainer, a delivery spout connected to the vessel over one of the ports, a discharge pipe for the coffee receptacle opening at the side of the cylinder so as to be in communication with said spout in the upper end position of the cylinder, and means for admitting water through the top of the vessel.

2. The structure claimed in claim 1 in combination with a fan communicating with the vessel through one of the ports, and means for operating said fan in conjunction with the coffee mill so as to draw air through the coffee powder conduit into the vessel.

3. The structure claimed in claim 1 in combination with a gutter surrounding the vessel opposite a circumferential row of outlet ports, and a discharge pipe connected to the vessel over another outlet port so as to be in communication with the discharge pipe of the coffee receptacle when the strainer is situated immediately underneath said circumferential row of outlet ports, substantially as and for the purpose set forth.

4. The structure claimed in claim 1 in combination with a hopper for feeding coffee beans to the mill, and shutters arranged in different elevations in said hopper for apportioning the coffee to the mill.

ENRICO PISTONI.
LORENZO PISTONI.